United States Patent [19]

Azuma et al.

[11] 4,310,358

[45] Jan. 12, 1982

[54] COMPOSITION FOR FORMING INORGANIC HARDENED PRODUCTS AND PROCESS FOR PRODUCING INORGANIC HARDENED PRODUCTS USING THE SAME

[75] Inventors: Tomisaburo Azuma; Takeru Murakami; Haruyuki Date, all of Kadoma, Japan

[73] Assignee: Matsushita Electric Works, Ltd., Osaka, Japan

[21] Appl. No.: 196,976

[22] Filed: Oct. 14, 1980

Related U.S. Application Data

[63] Continuation of Ser. No. 107,105, Dec. 26, 1979, abandoned.

[30] Foreign Application Priority Data

Dec. 26, 1978 [JP] Japan .................................. 53/162778

[51] Int. Cl.$^3$ .............................................. C04B 7/02
[52] U.S. Cl. ........................................ 106/97; 106/99; 106/117
[58] Field of Search .................... 106/104, 117, 89, 97, 106/99

[56] References Cited

U.S. PATENT DOCUMENTS

| | | | |
|---|---|---|---|
| 3,645,750 | 2/1972 | Sadran | 106/117 |
| 3,857,714 | 12/1974 | Mehta | 106/104 |
| 3,997,353 | 12/1976 | Chervenka et al. | 106/104 |
| 4,012,264 | 3/1977 | Murray et al. | 106/104 |
| 4,019,917 | 4/1977 | Murray et al. | 106/104 |

*Primary Examiner*—James Poer
*Attorney, Agent, or Firm*—Sughrue, Mion, Zinn, Macpeak & Seas

[57] ABSTRACT

A composition for forming inorganic hardened products, which comprises a precursor for forming TSH, gypsum and a cement material selected from the group consisting of Portland cement, blast furnace slag and a mixture thereof, the amount of each ingredient satisfying the following relations by weight:

$$1/0.2 > TSH/Cement\ material > 1/5$$

$$1/0.1 > Precursor/Gypsum > 1/1$$

wherein TSH is the theoretical amount produced by the reaction of the TSH precursor and gypsum, and a process for producing inorganic hardened products from the composition.

10 Claims, No Drawings

COMPOSITION FOR FORMING INORGANIC HARDENED PRODUCTS AND PROCESS FOR PRODUCING INORGANIC HARDENED PRODUCTS USING THE SAME

This is a continuation of application Ser. No. 107,105, filed Dec. 26, 1979, now abandoned.

BACKGROUND OF THE INVENTION

1. Field of the Invention

The present invention relates to a composition for forming inorganic hardened products and a process for producing hardened products from the composition. More particularly, it relates to a composition for forming inorganic hardened products which comprises a precursor of calcium aluminate trisulfate hydrate (herein TSH), at least one member selected from the group consisting of Portland cement and blast furnace slag, and gypsum, and a process for producing inorganic hardened products from the composition.

2. Description of the Prior Art

Inorganic hardened products comprising calcium aluminate trisulfate hydrate ($3CaO.Al_2O_3.3CaSO_4.31\text{-}32H_2O$) have heretofore been known as inorganic hardened products for use as building materials and the like (U.S. Pat. Nos. 3,775,143 and 3,861,929). The inorganic hardened products are produced by blending calcium aluminate monosulfate ($3CaO.Al_2O_3.CaSO_4.12H_2O$, herein referred to as "MSH") and gypsum ($CaSO_4.2H_2O$) and optionally reinforcing fibers, adding water to the resulting blend to prepare a slurry, forming a desired shape from the slurry, and ageing and hardening the shaped article. In the process, the TSH formation reaction is as follows.

$$3CaO . Al_2O_3 . CaSO_4 . 12H_2O + 2CaSO_4 . 2H_2O +$$
$$15\text{-}16H_2O \longrightarrow 3CaO . Al_2O_3 . 3CaSO_4 . 31\text{-}32H_2O$$

The thus obtained inorganic hardened products comprising TSH have a light weight, an excellent fire-resistance and an excellent workability. However, since the TSH which is the main component in the products is gradually attacked by carbon dioxide gas in air, the products have the disadvantage that their strength deteriorates with the passage of time (i.e., poor weathering resistance).

SUMMARY OF THE INVENTION

As a result of investigations to improve inorganic hardened products comprising TSH as a main component, it has been found that where a material (hereinafter referred to as a "cement material") selected from the group consisting of Portland cement, blast furnace slag and a mixture thereof is added to a blend of a TSH precursor and gypsum, the reaction between the precursor and gypsum proceeds theoretically as mentioned in the reaction formula.

The further investigations confirmed that where the TSH precursor, cement material and gypsum are blended in specific amounts and inorganic hardened products are produced using the blends, weatherability improves. The precursor and gypsum do not completely convert to TSH and remain in certain amounts in their original forms and the inorganic hardened products comprise a four-component system of the precursor-gypsum-TSH-cement material. The proportion of the precursor, gypsum and cement material which are resistant to the attack by carbon dioxide, becomes large in the hardened products whereby deterioration of the strength with the passage of time almost does not occur. The present invention has thus been accomplished.

Accordingly, one object of the present invention is to provide a composition for forming inorganic hardened products which comprises a precursor of TSH, gypsum and cement materials in specific amounts.

Another object of the present invention is to provide a process for producing inorganic hardened products using the composition

DETAILED DESCRIPTION OF THE INVENTION

The composition for forming inorganic hardened products according to the present invention comprises a mixture of a precursor for forming TSH, gypsum and a cement material in amounts satisfying the following weight relations.

$$5/1 > TSH/Cement\ material > 1/5$$

$$10/1 > Precursor/Gypsum > 1/1$$

wherein TSH is a theoretical amount thereof produced by the reaction of the precursor and gypsum, and the ratio is by weight.

The amounts of the precursor, gypsum and cement material for producing inorganic hardened products according to the present invention are determined by, for example, the following two methods.

(1) A cement material is weighed in the desired amount. The amount of gypsum is determined such that the amount of TSH which is produced when a precursor of TSH and gypsum are theoretically reacted (when the MSH/gypsum weight ratio is 1/0.55, 2 weight ratio of TSH is produced) falls within the following range with respect to the amount of cement material.

$$5/1 > TSH/Cement\ material > 1/5$$

Then, the amount of precursor is determined on the basis of the amount of gypsum obtained above such that the precursor/gypsum weight ratio falls within the following range.

$$10/1 > Precursor/Gypsum > 1/1$$

(2) A cement material is weighed in the desired amount. The amount of a precursor is determined such that the amount of TSH which is produced when the precursor and gypsum are theoretically reacted falls within the following range with respect to the amount of cement material.

$$5/1 > TSH/Cement\ material > 1/5$$

Then, the amount of gypsum is determined on the basis of the amount of the precursor obtained such that the precursor/gypsum weight ratio falls within the following range.

$$10/1 > Precursor/Gypsum > 1/1$$

Thus, the amounts of the TSH precursor, gypsum and cement material are obtained as explained above.

If the TSH/cement material weight ratio is greater than 5/1 (i.e., the amount of cement material is small and the amount of TSH is large), the inorganic hardened products obtained have poor weathering resistance. On the other hand, if the TSH/cement material weight ratio is less than 1/5 (i.e., the amount of TSH is small and the amount of cement material is large), the inorganic hardened products obtained have poor strength, and as a result, an efflorescence due to the alkali occurs and when glass fibers are used as reinforcing fibers, alkali deterioration of glass fibers is remarkable.

Further, if the precursor/gypsum weight ratio is greater than 10/1 (i.e., the amount of the precursor is large), the inorganic hardened products obtained have poor strength. On the other hand if the precursor/gypsum weight ratio is less than 1/1, the inorganic hardened products obtained have poor weathering resistance.

Any material can be used as a precursor of TSH in the present invention if it forms TSH upon reaction with gypsum in the presence of water. Representative examples of TSH precursor are MSH, $3CaO.Al_2O_3$(-herein $C_3A$), $3CaO.Al_2O_3.6H_2O$ (herein $C_3AH_6$), $3CaO.3Al_2O_3.CaSO_4$(herein $C_4A_3S^-$) and the like. Of these, MSH is most preferred. The term "MSH" includes activated MSH prepared by treating MSH with an acid or mechanically pulverizing MSH to form fine particles.

Where MSH is used as the precursor, a preferred ratio is $5/1 > MSH/Gypsum > 1/1.5$. Where $C_3A$ is used as the precursor, a preferred ratio is $1/1 > C_3A/Gypsum > 1/4$. Where $C_3H_6$ is used as the precursor, a preferred ratio is $2/1 > C_3H_6/Gypsum > 1/3$. Where $C_4A_3S^-$ is used as the precursor, the range of $10/1 > C_4A_3S^- > 1/1$ mentioned above can provide the desired effect.

The gypsum used in the present invention includes $CaSO_4.2H_2O$, $CaSO_4.\frac{1}{2}H_2O$ and anhydrous $CaSO_4$.

Examples of the cement material used in the present invention are Portland cement, blast furnace slag and mixture of the Portland cement and blast furnace slag. The mixture is generally known as blast furnace slag cement. Of these cement materials, the blast furnace slag cement is most preferred.

The composition according to the present invention may additionally contain reinforcing fibers (such as inorganic fibers or organic fibers), various fillers and the like. The reinforcing fibers are used in an amount of about 40% by weight or less based on the weight of the hardened product (dry basis), and it is preferred that the amount of organic fibers is about 30% by weight or less based on the weight of the hardened product (dry basis) and the amount of inorganic fibers is about 10% by weight or less based on the weight of the hardened product (dry basis). The fillers are used in an amount of 20% by weight or less based on the weight of the hardened product.

Examples of the reinforcing fibers are various kinds of glass fibers (e.g., alkali resistant glass fiber), polypropylene fibers, and the like. Examples of the fillers are asbestos, rock wool, perlite, zeolite, cellulose and the like.

The composition according to the present invention may also contain a magnesium compound. Examples of the magnesium compound are $MgO$, $Mg(OH)_2$ and a mixture thereof. The magnesium compound is used in an amount of 3 to 10% by weight or less (calculated as Mg) based on the weight of the hardened product (dry basis). The magnesium compound promotes hydration hardening of the cement material during production of the hardened product and after production of the hardened product, forms a carbonated product by reacting with carbon dioxide gas in air, and the carbonated product buries pores formed by carbonation of TSH.

The composition according to the present invention may further contain calcium silicate in an amount of 30% by weight or less based on the weight of the hardened product (dry basis). The calcium silicate promotes hydration hardening of the cement material (e.g., blast furnace slag cement) during production of the hardened product, whereby excellent product strength is exhibited rapidly.

The composition according to the present invention may further contain a chloride other than $CaCl_2$ (this is included as a category of calcium compound). Examples of the chloride are $NaCl$, $KCl$, $MgCl_2$ and $HCl$. The chloride can be used alone or as a mixture thereof. The chloride is used in an amount of about 5% by weight or less based on the weight of the hardened product (dry basis). The chloride promotes hydration reaction of the cement material during production of the hardened product, and excellent strength of the product is developed in a short period of time.

Using the above composition, a hardened product is prepared by, for example, the following manner.

The desired amounts of the TSH precursor, cement material and gypsum, and optionally additives are weighed. These starting materials are sufficiently kneaded in the presence of water to prepare a slurry. The slurry is formed into a desired shape by, for example, casting or compression molding, and the shaped article is aged and hardened under a moist and heated atmosphere to prepare a hardened product.

Where the shaped article is allowed to stand at room temperature, TSH formation proceeds 4-8 hours after shaping. Therefore, the ageing of the shaped product must be carried out within the above-mentioned period of time. The ageing is carried out under a moist and heated atmosphere. A moist atmosphere herein means an atmosphere in which the shaped article can stand and the moisture contained in the shaped articles does not evaporate but is retained in the shaped article.

The ageing temperature is about 80° to 90° C. If the temperature is lower than 80° C., the reaction rate for the TSH formation is too high as compared to the hardening rate of cement material and expansion of the shaped product occurs. On the other hand, if the temperature is higher than 90° C., the reaction rate for the TSH formation is very slow and TSH formation reaction proceeds after ageing under moist and heated atmosphere, which results in causing cracks in the hardened product.

The aging time is about 6 to 48 hours, preferably about 12 to 24 hours. If the aging time is shorter than 6 hours, reaction is not carried out sufficiently and a soft product is obtained. On the other hand, the upper limit for the ageing time (48 hours) is not critical and the ageing time longer than 48 hours can of course be employed. However, no further increased effect is obtained.

Where the shaped article is a plate, it may be compression molded prior to subjecting to ageing and hardening. Further, one or both surfaces of the plate may be coated with cement powder. A suitable coating rate is about 100 to 1,000 g/m², preferably about 300 to 700 g/m². Examples of the cement powder are blast furnace slag, Portland cement, blast furnace cement, alumina cement and the like.

The inorganic hardened product thus obtained comprises a four-component system of TSH precursor (e.g., MSH)/gypsum/TSH/hardened product of cement material and is light, has excellent weathering resistance, flame-retardance and workability. Further, since crystals of TSH and crystals of hardened product of cement material are intertwined in the hardened product, the hardened product has high strength and since the hardened product contains TSH which has a large impact strength, the impact strength of the hardened product is excellent. In addition, the shrinkage caused during hardening of the cement material corresponds to the expansion of TSH during hardening and the size stability of the hardened product is excellent.

The present invention will be explained in greater detail by reference to the following examples, but is not limited thereto. Unless otherwise indicated, all percentages, parts, ratios and the like are by weight.

EXAMPLE 1

MSH, gypsum ($CaSO_4.2H_2O$) and blast furnace cement (Type C, according to JIS R-5211) were blended so as to satisfy the following relations.

TSH/Blast furnace slag cement = 1/1
MSH/Gypsum = 1/0.56

Pulp, glass fiber and perlite were added to the resulting blend in an amount of 5%, 1% and 5% by weight based on the weight (dry basis) of the inorganic hardened product finally obtained, respectively. Water was added to the resulting mixture to prepare a 10% slurry. Using the slurry, a plate having a thickness of 12 mm was prepared.

The plate was aged at 80° C. for 6 hours under high humidity atmosphere and further aged at room temperature for 1 week under high humidity atmosphere to obtain an inorganic hardened plate.

EXAMPLE 2

MSH, gypsum ($CaSO_4.2H_2O$) and blast furnace cement (Type C) were blended so as to satisfy the following relations.

TSH/Blast furnace slag cement = 1/0.6
MS/Gypsum = 1/0.7

Pulp, glass fiber and asbestos were added to the resulting blend in an amount of 8%, 0.5% and 5% by weight based on the weight (dry basis) of the inorganic hardened product finally obtained, respectively. Using the mixture, a 6 mm thick inorganic hardened plate was prepared in the same manner as in Example 1.

EXAMPLE 3

MSH, gypsum ($CaSO_4.2H_2O$) and blast furnace cement (Type C) were blended so as to satisfy the following relations.

TSH/Blast furnace slag cement = 1/3
MSH/Gypsum = 1/0.8

Pulp, glass fiber and polypropylene fiber were added to the resulting blend in an amount of 3%, 1.5% and 1% by weight based on the weight (dry basis) of an inorganic hardened product finally obtained, respectively. Using the mixture, an inorganic hardened plate was prepared in the same manner as in Example 1.

EXAMPLE 4

MSH, gypsum ($CaSO_4.2H_2O$) and blast furnace cement (Type B, according to JIS R-5211) were blended so as to satisfy the following relations.

TSH/Blast furnace slag cement = 1/1.5
MSH/Gypsum = 1/0.56

Glass fiber, polypropylene fiber and methyl cellulose were added to the resulting blend in an amount of 3%, 1% and 1% by weight based on the weight (dry basis) of an inorganic hardened product finally obtained, respectively. Water was added to the mixture in an amount of 35% by weight based on the weight of the mixture and kneaded. The resulting mixture was extrusion molded using an extruder to obtain a 6 mm thick plate. Using the plate, an inorganic hardened plate was prepared in the same manner as in Example 1.

COMPARATIVE EXAMPLE 1

An inorganic hardened plate was prepared in the same manner as in Example 1 except that the amounts of MSH, gypsum and blast furnace cement were changed to satisfy the following relations.

TSH/Blast furnace slag cement = 1/1
MSH/Gypsum = 1/0.

COMPARATIVE EXAMPLE 2

An inorganic hardened plate was prepared in the same manner as in Example 2 except that the amounts of MSH, gypsum and blast furnace cement were changed so as to satisfy the following relations.

TSH/Blast furnace slag cement = 1/0.1
MSH/Gypsum = 1/0.7.

COMPARATIVE EXAMPLE 3

An inorganic hardened plate was prepared in the same manner as in Example 3 except that the amounts of MSH, gypsum and blast furnace cement were changed so as to satisfy the following relations.

TSH/Blast furnace slag cement = 1/5
MSH/Gypsum = 1/0.8

The various physical properties of the inorganic hardened plates obtained in Examples 1 to 4 and Comparative Examples 1 to 3 were measured, and the results obtained are shown in Table 1 below.

TABLE 1

| | Specific Gravity | Bending Strength (kg/cm$^2$) | Sharpy Impact Strength (kg . cm/cm$^2$) | Size Stability*1 (%) | Flame Resistance | Workability*2 | Weathering Resistance*3 |
|---|---|---|---|---|---|---|---|
| Example 1 | 0.95 | 120 | 3.0 | +0.08 | Grade 1 | ◎ | o |
| Example 2 | 1.05 | 140 | 4.5 | +0.06 | " | ◎ | o |
| Example 3 | 1.10 | 110 | 3.5 | +0.09 | " | ◎ | o |
| Example 4 | 1.50 | 200 | 6.0 | +0.05 | " | o | o |
| Comparative Example 1 | 0.95 | 70 | 2.5 | +0.08 | Grade 1 | Δ | o |

TABLE 1-continued

| | Specific Gravity | Bending Strength (kg/cm²) | Sharpy Impact Strength (kg.cm/cm²) | Size Stability*¹ (%) | Flame Resistance | Work-ability*² | Weathering Resistance*³ |
|---|---|---|---|---|---|---|---|
| Example 2 | 1.03 | 110 | 3.5 | +0.07 | " | x | x |
| Comparative Example 3 | 1.15 | 80 | 2.0 | +0.20 | Grade 3 | x | o |

*¹Plate was immersed in water for 24 hours and the size was measured.
*² ⊚ : excellent
o : good
Δ : slightly poor
x : poor
*³o : good
x : poor Table 1 clearly shows that the inorganic hardened plates obtained in the examples have excellent bending strength, impact strength, flame resistance, workability and weathering resistance as compared to ones obtained in the comparative examples.

EXAMPLES 5-16 AND COMPARATIVE EXAMPLES 4-7

$C_3AH_6$ and gypsum ($CaSO_4.2H_2O$) were blended in the ratio as shown in Table 2 below, and blast furnace slag ("Esment", a product of Shin-Nippon Seitetsu Kagaku) was added to the blend in an amount as shown in Table 2 below (based on the weight of solids content in the composition). Further, water was added to the mixture in the weight ratio of water/total solids content=0.58-0.62 (in the comparative examples, 0.35) and kneaded with a mixer to prepare a slurry.

Using the slurry, a 8-10 mm thick plate was prepared by casting method. The plate was aged under the conditions shown in Table 2 below in high humidity atmosphere. Then, the plate was air dried at 20°-25° C. and 50-60% RH.

The physical properties of each of the inorganic hardened products were measured, and the results obtained are shown in Table 2 below.

TABLE 2

| | $C_3AH_6$/Gypsum | Amount of Slag (%) | Temperature (°C.) | Ageing Time (day) |
|---|---|---|---|---|
| Example 5 | 2.2/1 | 10 | Room temp. | 7 |
| Example 6 | " | 20 | " | " |
| Example 7 | " | 50 | " | " |
| Example 8 | " | 80 | " | " |
| Example 9 | " | " | " | " |
| Example 10 | " | 20 | 60 | 2 |
| Example 11 | " | 50 | " | " |
| Example 12 | " | 10 | " | " |
| Example 13 | 1.5/1 | 50 | Room temp. | 7 |
| Example 14 | " | " | 60 | 2 |
| Example 15 | 3.0/1 | " | Room temp. | 7 |
| Example 16 | " | " | 60 | 2 |
| Comparative Example 4 | 2.2/1 | 0 | Room temp. | 7 |
| Comparative Example 5 | " | 0 | 60 | 2 |
| Comparative Example 6 | 1.5/1 | 0 | Room temp. | 7 |
| Comparative Example 7 | 3.0/1 | 0 | 60 | " |

| | TSH*¹ Formation | Volume*² Expansion | Density (g/cm³) | Bending Strength (kg/cm²) |
|---|---|---|---|---|
| Example 5 | o | 1.2 | 1.00 | 36 |
| Example 6 | o | None | 1.20 | 75 |
| Example 7 | o | " | 1.21 | 80 |
| Example 8 | o | " | 1.18 | 68 |
| Example 9 | Unreacted | " | 1.21 | 50 |
| | material remained slightly | | | |
| Example 10 | o | " | 1.22 | 70 |
| Example 11 | o | " | 1.22 | 80 |
| Example 12 | o | 1.5 | 0.80 | 10 |
| Example 13 | o | None | 1.21 | 60 |
| Example 14 | o | " | 1.20 | 55 |
| Example 15 | o | " | 1.21 | 65 |
| Example 16 | o | " | 1.20 | 65 |
| Comparative Example 4 | ▫ | 2.5 | 0.82 | 7 |
| Comparative Example 5 | o | 3.0 | 0.70 | 5 |
| Comparative Example 6 | o | 2.0 | 1.00 | 25 |
| Comparative Example 7 | o | 2.2 | 1.10 | 35 |

*¹o means that TSH formation reaction completed.
*²The value is expansion ratio (times) as compared to the initial volume.

EXAMPLES 17-19

MSH, blast furnace slag ("Esment", as defined before) and gypsum ($CaSO_4.2H_2O$) were mixed such that the amount of blast furnace slag was as shown in Table 3 (based on the weight of the total solids content), and the blending ratio of MSH and gypsum was set to the theoretical weight ratio for TSH formation (MSH/gypsum=0.64/0.36).

Water was added to the blend in an amount of water/total solids content=0.1 and kneaded with a mixer to prepare a slurry.

Using the slurry, a plate was prepared. The plate was aged under the conditions shown in Table 3 below at 100% RH. Then, the plate was air dried at 20°-25° C. and 50-60% RH.

It was recognized with X-ray diffraction in each example that TSH formation reaction finished completely.

TABLE 3

| Example | Amount of Slag (%) | Ageing Temp. (°C.) | Ageing Time (hr) | Density (kg/cm³) | Bending Strength (kg/cm²) |
|---|---|---|---|---|---|
| 17 | 20 | 60 | 6 | 1.0 | 42 |
| 18 | 50 | " | " | " | 46 |
| 19 | 80 | " | " | " | 44 |

While the invention has been described in detail and with reference to specific embodiments thereof, it will be apparent to one skilled in the art that various changes and modifications can be made therein without departing from the spirit and scope thereof.

What is claimed is:

1. A composition for forming inorganic hardened products, which comprises a precursor for forming calcium aluminate sulfate trihydrate, which precursor is calcium aluminate monosulfate, gypsum and a cement material selected from the group consisting of Portland cement, blast furnace slag and a mixture thereof, the amount of each ingredient satisfying the following relations by weight:

$$1/0.2 > \text{calcium aluminate sulfate trihydrate} > 1/1.5$$

$$1/0.1 > \text{Precursor/Gypsum} > 1/1$$

wherein the calcium aluminate sulfate trihydrate is present in the theoretical amount produced by the reaction of said precursor of calcium aluminate sulfate trihydrate and gypsum.

2. The composition of claim 1, which includes about 40% by weight or less of a reinforcing fiber.

3. The composition of claim 1, which includes about 20% by weight or less fillers.

4. The composition of claim 1, which includes a magnesium compound selected from the group consisting of $MgO$, $Mg(OH)_2$ and a mixture thereof.

5. The composition of claim 4, wherein the amount of said magnesium compound is about 3 to 10% by weight of less.

6. The composition of claim 1, which includes zeolite.

7. The composition of claim 1, which includes a chloride selected from the group consisting of NaCl, KCl, $MgCl$, HCl and mixtures thereof.

8. The composition of claim 7, wherein the amount of chloride is about 5% by weight or less.

9. The composition of claim 1, wherein said calcium aluminate monosulfate is activated.

10. A process for producing inorganic hardened products which comprises shaping a slurry containing a precursor for calcium aluminate sulfate trihydrate, which precursor is calcium aluminate monosulfate, gypsum and a cement material into the desired form and ageing and hardening the formed product to form an inorganic hardened product, characterized in that the ageing and hardening of the product is initiated within about 4–8 hours from shaping and the ageing is carried out at about 80° to 90° C. for about 6 to 48 hours in a high humidity atmosphere.

* * * * *